United States Patent
Bach

[11] 3,719,044
[45] March 6, 1973

[54] HYBRID BRAKE BOOSTER CONTROL VALVE

[75] Inventor: Lloyd G. Bach, South Bend, Ind.

[73] Assignee: The Bendix Corporation, South Bend, Ind.

[22] Filed: Aug. 18, 1971

[21] Appl. No.: 172,803

[52] U.S. Cl. .................60/51, 60/54.6 P, 91/391
[51] Int. Cl. .................F01b 25/00, F15b 1/02
[58] Field of Search .............60/51, 54.6 P; 91/391

[56] References Cited

UNITED STATES PATENTS

| | | | |
|---|---|---|---|
| 3,074,383 | 1/1963 | Schultz | 60/51 X |
| 3,131,538 | 5/1964 | Schultz et al. | 60/51 |
| 3,133,417 | 5/1964 | Hager | 60/51 |

*Primary Examiner*—Edgar W. Geoghegan
*Attorney*—Ken C. Decker

[57] ABSTRACT

A hydraulic brake booster is disclosed which is normally operated by fluid pressure delivered to the booster from the vehicle's power steering pump. However, an auxiliary fluid supply is also provided which delivers pressurized fluid to the booster when the vehicle's power steering pump fails to operate, due either to a malfunction of the latter or to termination of operation of the vehicle's engine while the vehicle is in motion. The auxiliary fluid supply includes an accumulator which is charged by pressurized fluid from the power steering pump while the latter operates normally. A conduit is provided which communicates the accumulator directly into the booster pressure chamber. A control valve is provided which controls communication of fluid from the accumulator to the pressure chamber. The control valve is operated by the operator-operated spool which also controls fluid communication between the power steering pump and the booster upon actuation of the spool valve after operation of the power steering pump terminates. The control valve is responsive to the fluid pressure level in the pressure chamber such that the control valve remains closed as long as high pressure fluid exists in the pressure chamber, but may be easily operated when a relatively low pressure level exists in the pressure chamber.

10 Claims, 2 Drawing Figures

INVENTOR.
LLOYD G. BACH
BY Ken C. Decker
ATTORNEY

INVENTOR.
LLOYD G. BACH
BY Ken C. Decker
ATTORNEY

HYBRID BRAKE BOOSTER CONTROL VALVE

BACKGROUND OF THE INVENTION

This invention relates to a hydraulic brake booster having an auxiliary fluid supply.

Because of their smaller size and lower weight, hydraulically operated brake boosters are expected to be used in lieu of existing vacuum units in the near future. These hydraulic booster units use pressurized fluid developed by the vehicle's power steering pump to provide a power assist to the vehicle operator when the brakes of the vehicle are applied. One difficulty with hydraulic brake boosters is that if the power steering pump terminates operation for any reason, the vehicle's brakes revert to manual operation. Therefore, it is desirable to provide a reserve hydraulic system to supply fluid to the booster when the power steering pump ceases to operate. This may be accomplished by providing an accumulator which is charged during normal operation of the power steering pump and therefore may provide fluid pressure to the booster when the pump is not operating. To maximize response of the booster, it is desirable to communicate the fluid stored in the booster directly to the pressure chamber when the malfunction of the power steering pump occurs. Of course, it is also necessary to provide a control valve which controls the fluid communication between the accumulator and the pressure chamber which will not open during normal operation of the booster, but which may be opened by a relatively small force when necessary.

Another problem inherent in prior art boosters having an accumulator for fail-safe operation is that normally the fluid delivered to the pressure chamber by the vehicle's power steering pump can be at pressure levels of up to approximately 1,200 psi, while the desired pressure stored in the accumulator is at a much lower pressure. Therefore, unless means are provided to prevent fluid communication between the pressure chamber and the accumulator during normal operation of the booster, the high pressure fluid in the pressure chamber will communicate into the accumulator, slowing the response of the brake booster during normal operation.

SUMMARY OF THE INVENTION

Therefore, an important object of my invention is to provide a control valve for an auxiliary fluid system used with a hydraulic brake booster that remains closed during normal operation of the booster, but may be easily actuated when a malfunction terminates normal operation of the vehicle's main fluid supply.

Another important object of my invention is to provide a control valve for an auxiliary fluid supply used with a hydraulic brake booster that may be actuated by a relatively small operator-applied input force.

Another important object of my invention is to prevent backflow into the accumulator from the booster pressure chamber when high pressure fluid is being delivered to the latter from the vehicle's power steering pump.

Another important object of my invention is to decrease the response time of a brake booster having an auxiliary fluid supply system during normal operation of the booster.

DETAILED DESCRIPTION

Figure 1:
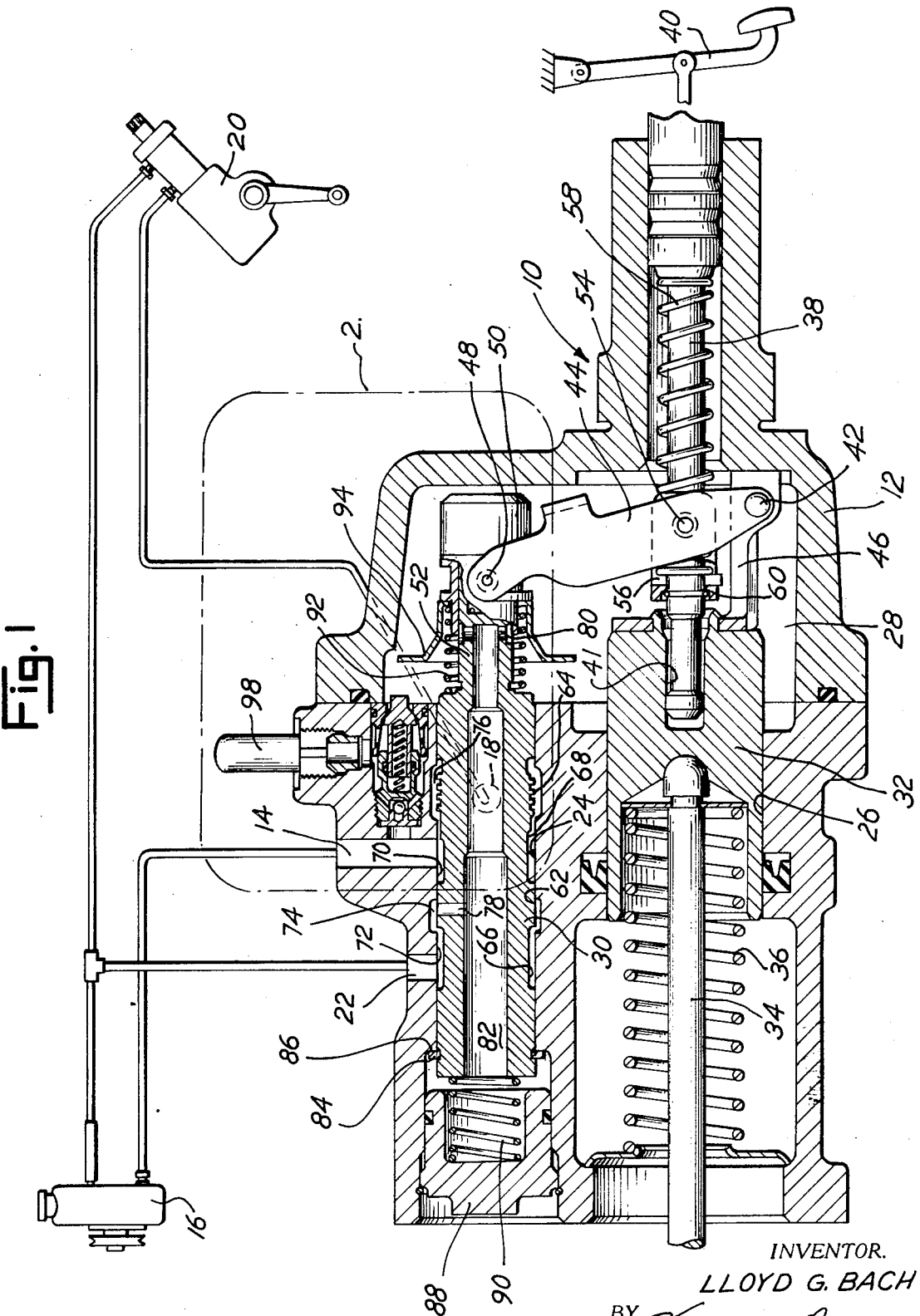
FIG. 1 is a schematic view of a vehicle hydraulic system with a brake booster made pursuant to the teachings of my present invention illustrated in cross-section.

Referring now to the drawings, the brake booster 10 includes a housing 12 and an inlet 14 communicated to the outlet or high pressure side of the vehicle's power steering pump 16, an outlet port 18 which is communicated to the inlet of the vehicle's power steering gear 20, and a return or exhaust port 22. The outlet of the power steering gear 20 and the return port 22 are each communicated to a reservoir (not shown) and the inlet of the power steering pump 60.

The housing 12 defines a first bore 24, a second bore 26, and a pressure chamber 28 therewithin. A spool valve 30 is slidably mounted in the bore 24 and is adapted to control communications between the ports 14, 18, and 22 as will be more fully described hereinafter. A piston 32 is slidably mounted in the bore 26 and projects into the pressure chamber 28. A rod 34 connects the piston 32 with a standard automotive master cylinder (not shown) mounted to the left of the housing 12. A spring 36 yieldably urges the piston 32 to the right viewing FIG. 1, toward the brake release position. One end of a control rod 38 is connected to a brake pedal 40 which is mounted in the operator's compartment of the vehicle, and the other end of the rod 38 is slidably received in a blind bore 41 provided in the piston 32. A first pivot 42 connects one end of a lever 44 to a bracket 46 carried by the piston 32. A second pivot 48 connects the other end of the lever 44 to a cap member 50 which is slidably mounted on the reduced diameter portion 52 of the spool valve 30 which extends into the pressure chamber 28. A third pivot 54 connects the lever 44 to a bracket 56 which slides on the rod 38. A spring 58 yieldably urges the bracket 56 into engagement with a retainer 60 fixed to the rod 38.

Spool valve 30 includes lands 62, 64 and grooves 66, 68 which cooperate with lands 70, 72 and grooves 74, 76 on the wall of the bore 24 to control fluid communication into and out of the pressure chamber 28. The inlet port 14 communicates with groove 68, the outlet port 18 communicates with the groove 76, and the return port 22 communicates with the groove 66. Radially extending passages 78, 80 and an axially extending passage 82 within the spool valve 30 communicate the groove 74 with the pressure chamber 28. The spool valve 30 is shiftable from a first position defined by the engagement of a stop ring 84 with a shoulder 86 on the bore 24 to a second position defined by the engagement of the end of the spool valve 30 with a plug 88 closing the end of the bore 24. A spring 90 yieldably urges the spool valve 30 toward the first position. Another spring 92 yieldably urges the cap member 50 to the right viewing FIG. 1, thereby permitting fluid communication through the radial passage 80 into the pressure chamber 28. The spring 92 also retains an annular member 94 for movement with the cap member 50, the function of which will be described hereinafter.

Passage means generally indicated by the numeral 96 communicates an accumulator 98 with the pressure chamber 28. The passage means 96 includes a bore 100 provided within the housing 12. A valve supporting member 102 extends into the bore 100 and slidably supports a first valve member 104. A spring 106 yieldably urges a circumferentially extending valve seating area 108 on the valve member 104 into sealing engagement with a second valve member 110, which is slidably mounted within the bore 100, and thereafter urges the valve members 104 and 110 as a unit to the right viewing FIG. 2 until the valve member 110 engages a shoulder 112 on the housing 12. The outer circumferential surface of the valve member 104 cooperates with the wall of the bore 100 to define an annular chamber 114 therebetween into which the valve member 110 extends. An annular seal 116 carried by the valve supporting member 102 prevents fluid communication between the annular chamber 114 and a reaction chamber 118 defined between the end of the valve member 104 and the valve supporting member 102. The other end 120 of the valve member 104 extends through the valve member 110 and projects into the pressure chamber 28. Passage means 96 further includes a conduit 122 which communicates the annular chamber 114 with the accumulator 98. A second passage means generally indicated by the numeral 124 communicates the inlet port 14 with the annular chamber 114. A check valve 126 is located within the second passage means 124 and permits fluid communication between the inlet port 14 and the annular chamber 114, but prevents fluid communication in the reverse direction.

MODE OF OPERATION

Figure 2:
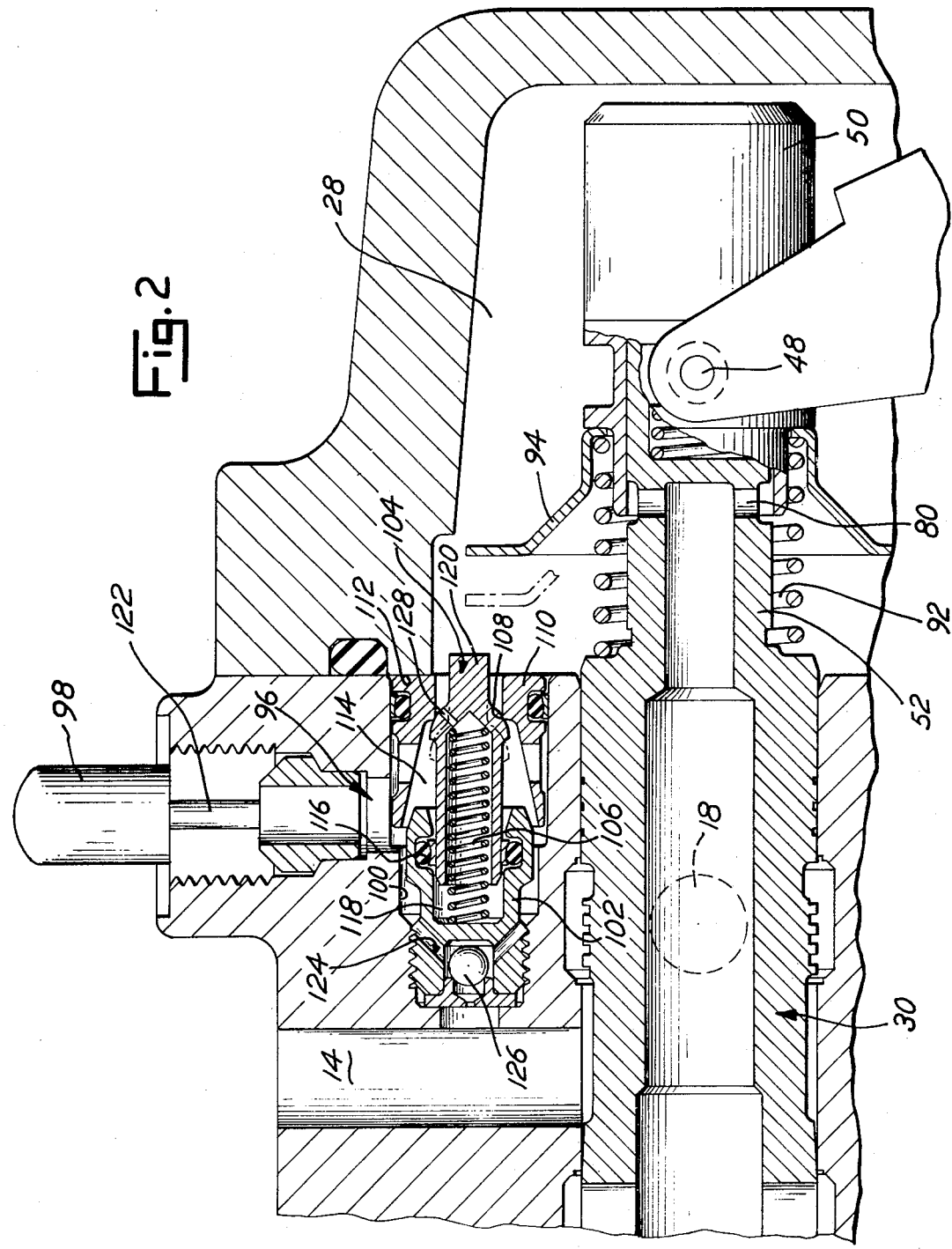
FIG. 2 is an enlarged, detailed view of the circumscribed portion of FIG. 1.

The various components of the brake booster 10 are illustrated in FIGS. 1 and 2 in the positions in which they assume when the brakes of the vehicle are released. In this position, the groove 74 is communicated with the groove 72 so that the pressure chamber 28 is communicated with the return or exhaust port 22. Also, groove 76 is communicated with the groove 68 so that the inlet port 14 is communicated with the outlet port 18. Engagement of the land 62 with the land 70 prevents fluid communication between the grooves 74 and 68, so that substantially all of the fluid flowing into the inlet port 14 is communicated directly to the outlet port 18. When a brake application is effected, the rod 38 is moved to the left viewing FIG. 1, thereby pivoting the levers 44 about the first pivot 42. Since the spring 92 is sufficiently strong to maintain the cap member 50 in its rightwardmost position during normal operation of the booster, pivoting of the levers 44 shifts the spool valve 30 to the left viewing FIG. 1. When this occurs, the land 62 engages the land 72, terminating fluid communication between the grooves 74 and 66 to thereby also terminate fluid communication between the pressure chamber 28 and the return or exhaust port 22. At the same time, fluid communication is initiated between the grooves 68 and 74, and the land 64 cooperates with the land 70 to define a flow restricting orifice between the groove 68 and the groove 76, to thereby cause the fluid pressure level to increase in the inlet port 14 and in the groove 68. A portion of this fluid is then communicated into the pressure chamber 28 through the groove 74 and the passages 78, 80 and 82, but the major portion of the fluid will be communicated to the outlet port 18. The relatively small amount of the pressure developed in the inlet port 14 will also be communicated into the accumulator 98 through the second passage means 124. Of course, it will also be noted by those skilled in the art that communication into the accumulator 98 also occurs whenever back pressure is developed in the hydraulic system by operation of the steering gear, to assure proper charging of the accumulator 98. Fluid pressure communicated into the pressure chamber 28 acts upon the end of the piston 32, to urge the latter to the left viewing FIG. 1. Movement of the piston 32 is transmitted to the master cylinder (not shown) by the rod 34, thereby developing braking pressure in the master cylinder in the normal manner.

When a malfunction terminates normal operation of the power steering pump 16, operation of the brake pedal 40 first shifts the spool valve 30 to the second position as described hereinabove. However, the increased force required of the vehicle operator collapses the spring 92, thereby permitting the cap member 50 to move to the left viewing FIG. 1, relative to the spool valve 30. Movement of the cap member 50 first closes the passages 80 to prevent an abrupt resumption of operation of the power steering pump 16 from communicating a surge of pressure to the pressure chamber 28. The annular member 94 engages the end 120 of the valve member 104 to shift the latter to the left relative to the valve member 110, to permit fluid to flow into the pressure chamber 28 from the accumulator 98 through the passage means 96.

Since the passage 128 communicates the pressure chamber 28 to the reaction chamber 118, equal pressure forces act on opposite sides of the valve member 104, thereby permitting a minimum operating force to open the valve. The accumulator thereby provides pressure fluid into the pressure chamber 28 to operate the booster in the normal manner for a predetermined number of brake applications, depending upon the size of the accumulator 98. When the fluid stored in the accumulator 98 is depleted, the still-higher operating force required for the vehicle operator collapses the spring 58 to permit the end of the rod 38 to engage the end of the blind bore 41, to permit the vehicle's brakes to be actuated manually.

The pressure level of the fluid stored in the accumulator 98 is normally substantially less than the fluid pressure level communicated to the pressure chamber 28 by the pump 16. Since the fluid pressure level in the pressure chamber is considerably higher than the fluid pressure level in the accumulator, whenever a brake application was effected in a prior art booster, the higher fluid pressure level in the pressure chamber opened the valve controlling fluid communication between the accumulator and the pressure chamber, thereby permitting high pressure fluid to flow from the pressure chamber to the accumulator. This slows the braking response of the booster considerably since the pump 16 is incapable of charging the accumulator and supplying fluid to the pressure chamber 28 at the same time. In the booster disclosed herein, fluid pressure existing in the pressure chamber 28 acts across the end of the valve members 104 and 112 exposed to the higher fluid pressure in the chamber 28, than in the accumulator, thereby shifting the valve member 112 and 104 as a unit to the left viewing FIGS. 1 and 2. Therefore, the valve member 112 is maintained in sealing engagement with the valve member 104 when the pressure in chamber 28 is higher than accumulator pressure, thereby preventing fluid communication between the annular chamber 114 and the pressure chamber 28. When the pressure level in chamber 114 is higher than the pressure level in chamber 28, valve means 104 remains in the position illustrated in FIG. 2, so that the end 120 of valve member 112 is contacted by the annular member 94 when the power steering pump 16 malfunctions and the pedal force applied to rod 58 is of sufficient magnitude to activate valve 104.

I claim:

1. In a hydraulic boost device:
 a housing defining a pressure chamber therewithin, said housing having an inlet port communicated with a pressure source and an outlet port;
 operator-actuated valve means for controlling fluid communication between said inlet and outlet ports and between said inlet port and said pressure chamber;
 an accumulator in fluid communication with said pressure chamber for supplying pressurized fluid to the latter after operation of said pressure source terminates; and
 second valve means for controlling fluid communication between said accumulator and said pressure chamber;
 said second valve means including means responsive to the fluid pressure level in said pressure chamber for maintaining said second valve means closed as the fluid pressure level communicated into said pressure chamber from said pressure source increases, said second valve means opening to communicate the accumulator to the pressure chamber upon actuation of said operator-actuated means after termination of operation of said pressure source.

2. The invention of claim 1; and
 passage means communicating said accumulator with said pressure chamber;
 said second valve means including a pair of valve members slidably mounted in said passage means, one of said valve members being movable relative to the other valve member to permit communication from the accumulator into said pressure chamber, said valve members moving as a unit in said passage means as the fluid pressure level communicated into said pressure chamber from said pressure source is increased to prevent fluid pressure in said pressure chamber acting on said one valve member from moving the latter relative to the other valve member.

3. The invention of claim 2:
 stop means within said passage means; and
 resilient means yieldably urging said one valve member into sealing engagement with the other valve member and thereafter urging said valve members as a unit toward said stop means.

4. The invention of claim 2:
 the outer surface of said one valve member cooperating with the wall of the passage means to define an annular chamber therebetween in fluid communication with said accumulator and with said pressure chamber, said outer surface of said one valve member having a valve seating area thereon cooperating with said other valve member to control fluid communication between said annular chamber and said pressure chamber; and
 resilient means yieldably urging said valve seating area into sealing engagement with said other valve member.

5. The invention of claim 4:
 an annular seal carried by said housing engaging the outer surface of said one valve member to define a reaction chamber between said one valve member and the end of the housing, said annular seal preventing fluid communication between said annular chamber and said reaction chamber; and
 second passage means extending through said one valve member to communicate said pressure chamber to said reaction chamber.

6. The invention of claim 4:
 conduit means communicating said annular chamber with said inlet port; and
 check valve means permitting flow of fluid from said inlet port into said annular chamber, but preventing flow of fluid in the opposite direction.

7. The invention of claim 1; and
 conduit means communicating said accumulator with said inlet port; and
 check valve means permitting flow of fluid from said inlet port into said accumulator but preventing flow of fluid in the opposite direction.

8. The invention of claim 2:
 said one valve member including a portion projecting into said pressure chamber;
 said operator-actuated valve means including means for engaging said projecting portion upon actuation of said operator-actuated valve means and termination of fluid communication from said pressure source to said inlet port.

9. In a hydraulic boost device:
 a housing defining a pressure chamber therewithin, said housing having an inlet port communicated with a pressure source and an outlet port;
 an operator-actuated spool valve slidably mounted in said housing and extending into said pressure chamber, said spool valve being shiftable from a first position venting said pressure chamber to a fluid reservoir and communicating substantially all of the fluid flowing into said inlet port to the outlet port to a second position impeding flow of fluid between said inlet and outlet ports and communicating a portion of the fluid flowing into said inlet port into said pressure chamber;
 an accumulator in fluid communication with said pressure chamber for supplying pressurized fluid to the latter after operation of said pressure source terminates;
 second valve means for controlling fluid communication between said accumulator and said pressure chamber;
 said second valve means including means responsive to the fluid pressure level in said pressure chamber for maintaining said second valve means closed as the fluid pressure level communicated into said pressure chamber from said pressure source increases; and means carried by the portion of the spool valve disposed in said pressure chamber for opening said second valve means to permit fluid communication from said accumulator into said reservoir after movement of the spool valve to said second position after termination of operation of said pressure source.

10. The invention of claim 9:
said spool valve defining a bore therein and having openings extending through the portion of the spool valve disposed in said pressure chamber, said bore and said openings communicating fluid pressure into said pressure chamber after movement of the spool valve toward the second position; and
a cap member slidably mounted on the spool valve in said pressure chamber and shiftable from a first condition permitting substantially uninhibited fluid communication through said openings to a second condition preventing fluid communication through said openings upon movement of the spool valve to the second position and termination of operation of said pressure source;
said means for opening said second valve means being carried by said cap member.

* * * * *